(12) United States Patent  
Ramamurthy

(10) Patent No.: US 8,931,265 B2  
(45) Date of Patent: Jan. 13, 2015

(54) CLOSED LOOP TEMPERATURE CONTROL IN THE SCR WARM UP MODE TO REDUCE EMISSION VARIATION

(75) Inventor: Ravishankar Ramamurthy, Livonia, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 217 days.

(21) Appl. No.: 13/468,089

(22) Filed: May 10, 2012

(65) Prior Publication Data

US 2013/0298528 A1 Nov. 14, 2013

(51) Int. Cl.
*F01N 3/00* (2006.01)
*F01N 3/10* (2006.01)
*F01N 3/02* (2006.01)
*F01N 3/20* (2006.01)

(52) U.S. Cl.
USPC .......... 60/301; 60/286; 60/295; 60/297; 60/299; 60/311

(58) Field of Classification Search
USPC .......... 60/277, 286, 295, 299, 300, 301
See application file for complete search history.

(56) References Cited

U.S. PATENT DOCUMENTS

| | | | |
|---|---|---|---|
| 2008/0223019 A1* | 9/2008 | Gonze et al. | 60/286 |
| 2008/0271440 A1* | 11/2008 | Xu et al. | 60/295 |
| 2010/0083639 A1* | 4/2010 | Mullins et al. | 60/285 |
| 2011/0000194 A1* | 1/2011 | Gonze et al. | 60/286 |
| 2011/0023456 A1 | 2/2011 | Levijoki et al. | |
| 2011/0030348 A1* | 2/2011 | Crawford et al. | 60/277 |
| 2011/0139136 A1* | 6/2011 | Guo et al. | 123/676 |
| 2011/0192143 A1* | 8/2011 | Andersson et al. | 60/274 |
| 2012/0216510 A1* | 8/2012 | Xu et al. | 60/274 |
| 2013/0108529 A1* | 5/2013 | Toshioka et al. | 423/212 |

* cited by examiner

*Primary Examiner* — Kenneth Bomberg
*Assistant Examiner* — Dapinder Singh

(57) ABSTRACT

An exhaust aftertreatment system for a diesel engine includes a selective catalytic reduction (SCR) device and a diesel oxidation catalyst upstream of the SCR device. A method for warming-up the SCR device includes monitoring a plurality of combustion input parameters during an SCR warm-up strategy, monitoring a first temperature and a second temperature within the aftertreatment system, providing a feedback adjustment term as a function of a deviation in the first temperature from a desired temperature only when the monitored first and second temperatures are within a predetermined adjustment range, and initiating an adjusted SCR warm-up strategy based on the feedback adjustment term to converge the first temperature toward the desired temperature.

18 Claims, 2 Drawing Sheets

CLOSED LOOP TEMPERATURE CONTROL IN THE SCR WARM UP MODE TO REDUCE EMISSION VARIATION

TECHNICAL FIELD

This disclosure is related to vehicle exhaust systems for diesel engines, and more particularly to warming-up a selective catalytic reduction (SCR) catalytic converter.

BACKGROUND

The statements in this section merely provide background information related to the present disclosure. Accordingly, such statements are not intended to constitute an admission of prior art.

Diesel engine operation involves combustion that generates exhaust gas. An air-fuel mixture is delivered through an intake valve to cylinders and is combusted therein. After combustion, the piston forces the exhaust gas in the cylinders into an exhaust system. The exhaust gas may contain emissions such as oxides of nitrogen (NOx) and carbon monoxide (CO).

Exhaust hardware technology is being added to meet emission requirements on diesel applications. After treatment of exhaust gases includes the installation of multiple bricks, mixers and injectors for the exhaust stream. Performance of aftertreatment devices, including selective catalytic reduction (SCR) devices, within an exhaust aftertreatment system are monitored.

It is known, that aftertreatment devices may require achieving a minimum desired temperature for attaining maximum conversion efficiency of the exhaust gases. Temperature variation from the minimum desired temperature can result from variation in driver behavior.

SUMMARY

An exhaust aftertreatment system for a diesel engine includes a selective catalytic reduction (SCR) device and a diesel oxidation catalyst upstream of the SCR device. A method for warming-up the SCR device includes monitoring a plurality of combustion input parameters during an SCR warm-up strategy, monitoring a first temperature and a second temperature within the aftertreatment system, providing a feedback adjustment term as a function of a deviation in the first temperature from a desired temperature only when the monitored first and second temperatures are within a predetermined adjustment range, and initiating an adjusted SCR warm-up strategy based on the feedback adjustment term to converge the first temperature toward the desired temperature.

BRIEF DESCRIPTION OF THE DRAWINGS

One or more embodiments will now be described, by way of example, with reference to the accompanying drawings, in which.

DETAILED DESCRIPTION

While the following disclosure is set forth for diesel engines, other types of engines such as gasoline engines, including direct injection engines, may benefit from the teachings herein.

Figure 1:
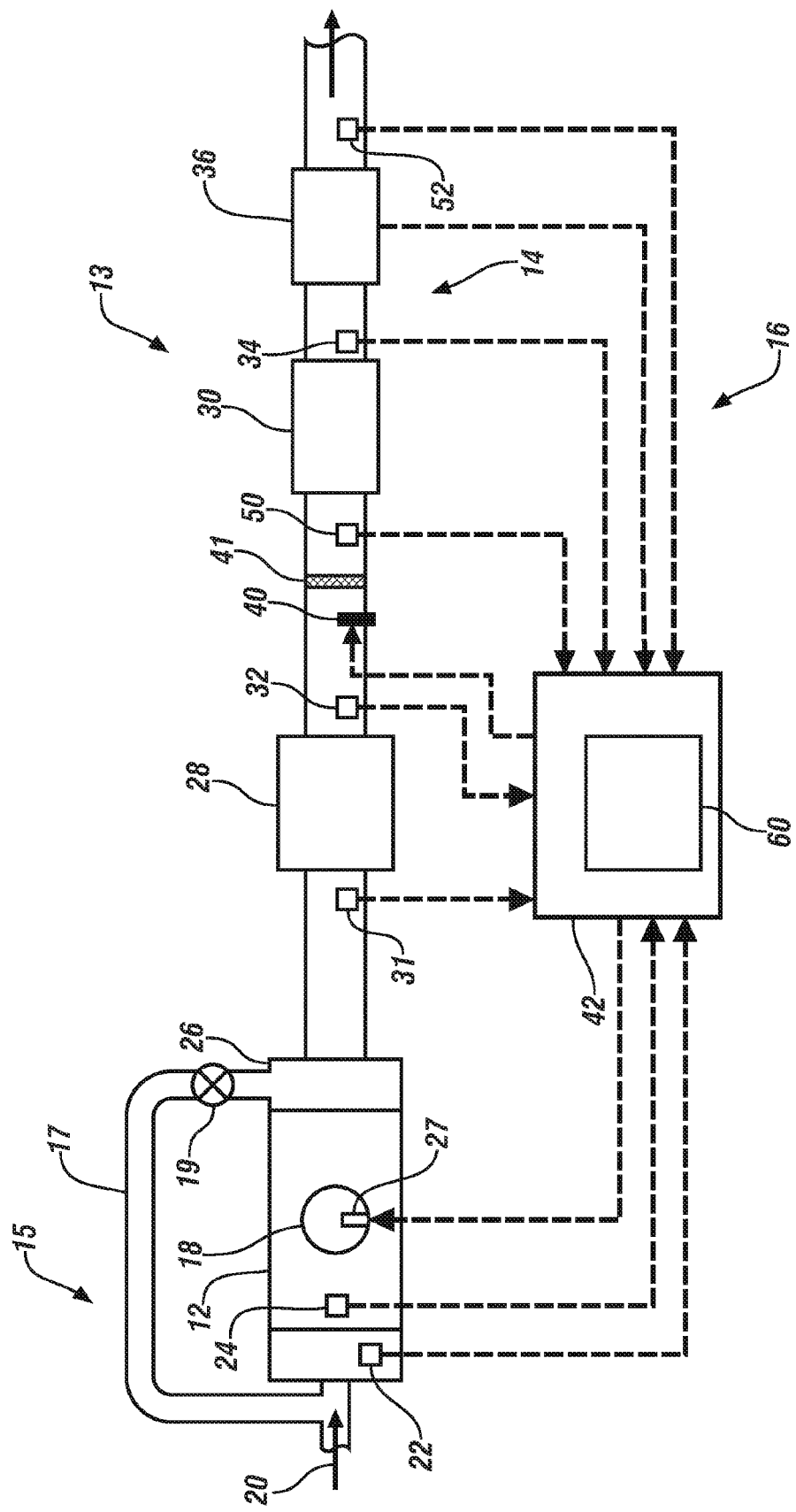
FIG. 1 illustrates a diesel engine and an exhaust system in accordance with the present disclosure.

Referring now to the drawings, wherein the showings are for the purpose of illustrating certain exemplary embodiments only and not for the purpose of limiting the same, FIG. 1 illustrates a diesel engine 12 and an exhaust system 13. The exhaust system 13 includes an exhaust aftertreatment system 14 and a dosing system 16. The diesel engine 12 includes a cylinder 18, an intake manifold 20, a mass air flow (MAF) sensor 22 and an engine speed sensor 24. Air flows into the engine 12 through the intake manifold 20 and is monitored by the MAF sensor 22. The air is directed into the cylinder 18 and is combusted with fuel injected into the cylinder 18 by a fuel injector 27 to drive pistons. The injected fuel can include pilot fuel injection events, main fuel injection events and post fuel injection events, wherein timing and quantity of fuel for the injection events may be adjusted. Although a single cylinder 18 is illustrated, diesel engine 12 may include additional cylinders 18. For example, diesel engines having 2, 3, 4, 5, 6, 8, 10, 12 and 16 cylinders are envisioned.

Exhaust gas is produced inside the cylinder 18 as a result of the combustion process. An exhaust gas recirculation (EGR) system 15 can direct portions of an exhaust gas feedstream back into the diesel engine 12 combined with fresh air mass for combustion in subsequent cycles. The EGR system 15 recirculates exhaust gases from engine-out exhaust to the intake manifold 20, having a flow control valve referred to as an exhaust gas recirculation (EGR) valve 19 disposed in a conduit 17 between an exhaust manifold 26 and the intake manifold 20. A control module 42 is operative to control mass flow of exhaust gas into the intake manifold 20 by controlling opening of the EGR valve 19. In an exemplary embodiment, the mass flow of exhaust gas into the intake manifold can be increased to reduce the MAF entering the diesel engine 12 during an adjusted SCR warm-up strategy. The reduced MAF entering the diesel engine increases the temperature of engine-out exhaust gas during subsequent cycles for warming-up a catalyst of an SCR device within the exhaust aftertreatment system 14 to a desired temperature.

The exhaust aftertreatment system 14 treats the exhaust gas feedstream before releasing the exhaust gas feedstream to the atmosphere. The exhaust aftertreatment system 14 includes the exhaust manifold 26 and a diesel oxidation catalyst (DOC) 28. The exhaust manifold 26 directs an exhaust gas feedstream exiting the cylinder towards the DOC 28. The exhaust gas feedstream is treated within the DOC 28 to reduce the emissions. The exhaust aftertreatment system 14 further includes a catalyst 30, preferably a selective catalyst reducing (SCR) device, a first temperature sensor 31, a second temperature sensor 32, a third temperature sensor 34 and a diesel particulate filter (DPF) 36. The DOC 28 reacts with the exhaust gas feedstream prior to treating the exhaust gas feedstream to reduce emission levels of the exhaust gas feedstream. The SCR device 30 reacts subsequent to treating the exhaust gas feedstream to further reduce emissions.

The first temperature sensor 31 may be positioned between the engine and the DOC 28. The second temperature sensor 32 is positioned downstream of the DOC 28 and upstream of the SCR device 30. The third temperature sensor 34 is located downstream of the SCR device 30. While the exhaust aftertreatment system 14 is illustrated as including the second and third temperature sensors 32, 34, respectively, as being outside the catalyst 30, the second and third temperature sensors 32, 34, can be positioned internally within the catalyst 30 (i.e., SCR device). It will be appreciated that one or both the second and third temperature sensors 32, 34, respectively, can be utilized for monitoring the temperature of the catalyst 30, including catalyst bed temperatures. It will be further appreciated that one or any variation of the first, second and third temperature sensors 31, 32, 34, respectively, can be utilized for monitoring the temperature of the DOC 28. The DPF 36 further reduces emissions by trapping diesel particulates (i.e., soot) carried within the exhaust gas feedstream.

The dosing system 16 may be used for injecting urea from a tank and a dosing injector 40. The dosing system 16 injects injection fluid such as urea into the exhaust gas feedstream. The urea mixes with the exhaust and further reduces the emissions when the exhaust/urea mixture is exposed to the catalyst 30. A mixer 41 is used to mix the injection fluid such as urea with the exhaust gas feedstream prior to the exhaust gas feedstream entering the catalyst 30.

The control module 42 regulates and controls the operation of the diesel engine 12, the EGR system 15 and controls and monitors operation of the dosing system 16. The control module further monitors 42 at least one of the first, second and third temperature sensors 31, 32, 34, respectively, for monitoring the temperature of the catalyst 30 (i.e., SCR device) and monitoring the temperature of the DOC 28.

Control module, module, control, controller, control unit, processor and similar terms mean any one or various combinations of one or more of Application Specific Integrated Circuit(s) (ASIC), electronic circuit(s), central processing unit(s) (preferably microprocessor(s)) and associated memory and storage (read only, programmable read only, random access, hard drive, etc.) executing one or more software or firmware programs or routines, combinational logic circuit(s), input/output circuit(s) and devices, appropriate signal conditioning and buffer circuitry, and other components to provide the described functionality. Software, firmware, programs, instructions, routines, code, algorithms and similar terms mean any controller executable instruction sets including calibrations and look-up tables. The control module has a set of control routines executed to provide the desired functions. Routines are executed, such as by a central processing unit, and are operable to monitor inputs from sensing devices and other networked control modules, and execute control and diagnostic routines to control operation of actuators. Routines may be executed at regular intervals, for example each 3.125, 6.25, 12.5, 25 and 100 milliseconds during ongoing engine and vehicle operation.

Other sensors in the exhaust system 13 may include NOx sensor 50 which generates a signal corresponding to the amount of oxides of nitrogen in the exhaust system 13. This may be referred to NOx-in since this sensor is upstream of the catalyst 30. A NOx-out sensor 52 may be positioned downstream such as after the DPF 36 for generating a signal corresponding to the oxides of nitrogen leaving the DPF 36. The upstream and downstream NOx may also be located in the catalyst.

After engine startup, such as during cold starts, the control module 42, including an Exhaust Gas Temperature Management (EGTM) module 60, may operate the diesel engine 10 in a special mode of operation (i.e., SCR warm-up mode) before switching to a normal mode of operation (i.e., normal operation mode). For example, the SCR warm-up mode may include an enriched air-fuel mixture compared to an air-fuel mixture corresponding to the normal operation mode. The SCR warm-up mode including the enriched air-fuel mixture increases the temperature of the engine-out exhaust gas feedstream to quickly heat up the catalyst 30 (i.e., SCR device) to a desired temperature.

The exhaust aftertreatment system 14 typically goes through multiple warm-up stages before it reaches its optimum or maximum operating efficiency range or zone. Generally, the multiple warm-up stages of the exhaust aftertreatment system 14 may include three stages of an Exhaust Gas Temperature Management (EGTM) strategy. The first stage includes a DOC 28 warm-up mode. In an exemplary embodiment, when a temperature of the DOC 28 is greater than or equal to a threshold temperature, the EGTM module 60 determines that the DOC 28 is warmed-up. The threshold temperature may correspond to a light-off temperature of the DOC 28 at which the diesel oxidation catalyst operates at maximum efficiency for oxidizing carbon monoxide and hydrocarbons among other emissions.

The second stage of the EGTM includes the SCR warm-up mode. In an exemplary embodiment, when a temperature of the catalyst 30 (i.e., SCR device) is at least the desired temperature, the EGTM module 60 determines that the catalyst 30 is warmed-up. The desired temperature can correspond to a light-off temperature of the catalyst 30 (i.e., SCR device) at which the catalyst 30 operates at maximum efficiency for conversion of NOx. In a non-limiting example, the desired temperature is at least about 225° C. In another non-limiting example, the desired temperature is at least about 250° C.

The third stage of the EGTM includes a catalyst 30 (i.e., SCR-device) temperature maintenance mode. The catalyst temperature maintenance mode can include periodically running an enriched air-fuel ratio during normal engine operation (i.e., normal operation mode) to maintain the desired temperature of the catalyst 30. For example, the EGTM module 60 can schedule the catalyst temperature maintenance mode based on periods when the engine is accelerating.

It will be appreciated that emission levels can vary from one vehicle to another. This emission variation can be attributed to variation in exhaust gas feedstream temperature based on individual operator behavior. Hence, an identical EGTM that includes the SCR warm-mode can yield a catalyst of an SCR device in one vehicle not achieving a desired temperature as quickly as it does in another vehicle due to operator behavior in each of the vehicles differing from one another. In an exemplary embodiment of the present disclosure, an adjusted SCR warm-up strategy can be initiated based on a feedback adjustment term to converge the SCR device temperature toward a desired temperature only when temperatures of the DOC 28 and the SCR device 30 are within an adjustment range. The adjusted SCR warm-up strategy will be discussed in greater detail below with reference to FIG. 2.

Figure 2:
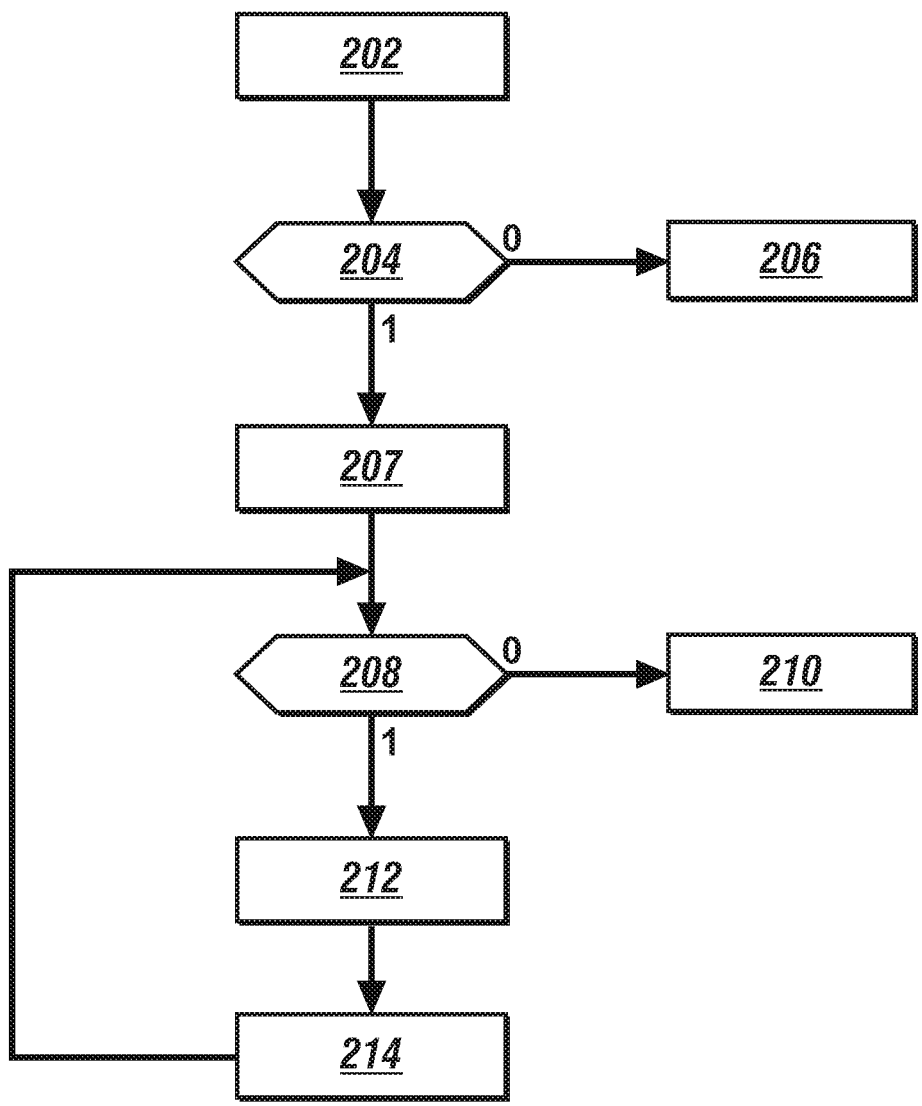
FIG. 2 illustrates a flow chart for initiating an adjusted selective catalytic reduction (SCR) device warm-up strategy in accordance with the present disclosure

FIG. 2. illustrates a flow chart 200 for initiating the adjusted SCR warm-up strategy in accordance with an exemplary embodiment of the present disclosure. The flow chart 200 is performed within the EGTM module 60 of the control module 42. Table 1 is provided as a key to FIG. 2 wherein the numerically labeled blocks and the corresponding functions are set forth as follows.

TABLE 1

| BLOCK | BLOCK CONTENTS |
|---|---|
| 202 | Start |
| 204 | Is the diesel engine 12 operating in an SCR warm-up mode? |
| 206 | The diesel engine 12 is operating in a normal operation mode |
| 207 | Monitoring a plurality of combustion input parameters |
| 208 | Is a monitored first temperature and a monitored second temperature within and adjustment range? |
| 210 | Normal operation mode of the diesel engine 12 when the first temperature ≥ a desired temperature OR SCR warm-up mode when the second temperature is < a threshold temperature |
| 212 | Provide a feedback adjustment term |
| 214 | Initiation of adjusted SCR warm-up strategy |

The flowchart 200 starts at block 202 and proceeds to decision block 204. Decision block 204 determines whether the diesel engine 12 is operating in an SCR warm-up mode.

As aforementioned, the SCR warm-up mode can be a second stage in the EGTM strategy and may include enriched air-fuel operation of the diesel engine compared to an air-fuel mixture corresponding to a normal operation mode of the diesel engine 12, wherein the enriched air-fuel mixture increases the temperature of the engine-out exhaust gas feedstream to heat-up an SCR device (i.e., catalyst 30) to a desired temperature. The SCR warm-up mode utilizes a plurality of combustion input parameters that are predetermined through calibration to achieve operation of the diesel engine 14 in the SCR warm-up mode. Accordingly, the plurality of combustion input parameters are based on open loop control. A "0" indicates that the diesel engine is not operating in the SCR warm-up mode. The flowchart 200 proceeds to block 206 corresponding to the normal operation mode of the diesel engine 12. A "1" indicates that the diesel engine is operating in the SCR warm-up mode. The flowchart 200 proceeds to block 207. Block 207 monitors the plurality of combustion input parameters during the SCR warm-up mode. The plurality of combustion input parameters are selected from the group consisting of: a monitored mass airflow into the diesel engine, a monitored post injected fuel mass into the diesel engine and a monitored main injection fuel timing of the diesel engine. The flowchart 200 then proceeds to decision block 208.

Decision block 208 determines whether a monitored first temperature and a second temperature are within an adjustment range. The adjustment range includes a range greater than a threshold temperature and less than the desired temperature. In one embodiment, the threshold temperature corresponds to a light-off temperature of the DOC 28 at which the DOC 28 operates at maximum efficiency. Thus, the threshold temperature can be referred to as a threshold DOC temperature. In one embodiment, the desired temperature corresponds to a light-off SCR device temperature (i.e., catalyst 30) at which the SCR device operates at maximum efficiency. Thus, the desired temperature can be referred to as a desired SCR device temperature. The monitored first temperature can include monitoring SCR device temperature (i.e., catalyst 30 temperature). Therefore, the first temperature can interchangeably be referred to as an SCR device temperature. The monitored second temperature can include monitoring a temperature of the DOC 28. Therefore, the monitored second temperature can interchangeably be referred to as a DOC temperature. In an exemplary embodiment of the present disclosure, the monitored first temperature (i.e., SCR device temperature) and the monitored second temperature (i.e., DOC temperature) can be measured at different locations within the exhaust aftertreatment system 14. For instance, the monitored SCR device temperature can be an average SCR device or catalyst temperature based on a weighted average of a measurement from the second temperature sensor 32 and the third temperature sensor 34 and the monitored DOC 28 temperature can correspond to a DOC 28 outlet temperature measured by the second temperature sensor 32. In a non-limiting example the average SCR device temperature is based on two-thirds weighting of the temperature measurement from the second temperature sensor 32 and one-third weighting of the temperature measurement form the third temperature sensor 34. Other weightings may be utilized based on development testing and calibrations. In another exemplary embodiment, the SCR device temperature can be a catalyst outlet temperature measured from the third temperature sensor 34. In yet another embodiment, the SCR device temperature can be obtained by directly measuring catalyst bed temperature within the SCR device and the DOC temperature can be obtained by directly measuring catalyst bed temperature within the DOC 28. In yet another exemplary embodiment, the monitored first temperature (i.e., SCR device temperature) and the monitored second temperature (i.e., DOC temperature) can be measured at the same location within the exhaust aftertreatment system 14. For instance, the monitored SCR device temperature and the monitored DOC 28 temperature can both be measured by the second temperature sensor 32.

A "0" indicates that decision block 208 has determined that the SCR device temperature and the temperature of the DOC 28 are not within the adjustment range. The flowchart 200 proceeds to block 210. Block 210 can correspond to the normal operation mode of the diesel engine 12 when the SCR device temperature 30 is at least the desired temperature. Additionally 210 can correspond to continued utilization of the SCR warm-up mode, without the initiation of the adjusted SCR warm-up strategy, when temperature of the DOC 28 is less than the threshold temperature.

A "1" indicates that decision block 208 has determined that the SCR device temperature and the temperature of the DOC 28 are within the adjustment range. The flowchart 200 proceeds to block 212. Block 212 provides a feedback adjustment term as a function of a deviation in the SCR device temperature (i.e., first temperature) from the desired temperature. In an exemplary embodiment, a proportional-integral (PI) controller is implemented within the EGTM module 60 and is utilized to provide the feedback adjustment term. Accordingly, the feedback adjustment term is a calibrated term proportional to the deviation in the SCR device temperature from the desired temperature provided as feedback. As will be discussed in greater detail below, the feedback adjustment term is utilized to determine magnitudes that at least one of the combustion input parameters should be adjusted proportional to the deviation in the SCR device temperature from the desired temperature to quickly converge the SCR device temperature toward the desired temperature. The flowchart 200 then proceeds to block 214.

In block 214, the adjusted SCR warm-up strategy is initiated. The adjusted SCR warm-up strategy is based on the feedback adjustment term to converge the SCR device temperature 30 (i.e. first temperature) toward the desired temperature. Specifically, the adjusted SCR warm-up strategy includes adjusting at least one of the combustion input parameters based on the feedback adjustment term to increase the SCR device temperature (i.e., first temperature) to achieve the desired temperature. When the SCR device temperature achieves the desired temperature, the adjusted SCR warm-up strategy is terminated or exited. Likewise, when the SCR device temperature achieves the desired temperature, the SCR warm-up mode is terminated and the diesel engine 12 enters the normal operating mode.

In one embodiment, the adjusting the at least one of the combustion input parameters based on the feedback adjustment term to increase the SCR device temperature (i.e., first temperature) to achieve the desired SCR device temperature (i.e., desired temperature) can include decreasing mass airflow into the diesel engine by a magnitude to converge the SCR device temperature toward the desired SCR device temperature. The decreased magnitude of mass airflow may be proportional to the feedback adjustment term. Accordingly, the decreased magnitude of mass airflow may be proportional to an increased magnitude of exhaust gas mass flow into the diesel engine to reduce the mass airflow into the diesel engine in accordance with the feedback adjustment term. In another embodiment, adjusting the at least one of the combustion input parameters based on the feedback adjustment term can include retarding main injection fuel timing within the diesel engine by a magnitude proportional to the feedback adjustment term. In yet another embodiment, adjusting the at least one of the combustion input parameters based on the feedback adjustment term can include increasing a post injected fuel mass into the diesel engine by a magnitude proportional to the feedback adjustment term.

In another exemplary embodiment of the present disclosure, adjusting the at least one of the combustion input parameters based on the feedback adjustment term to increase the SCR device temperature (i.e., first temperature) to achieve the desired temperature includes prioritizing each of the combustion input parameters from a highest priority to a lowest priority. For instance, the highest priority can include the combustion input parameter associated with the lowest operating cost when adjusted, relating to but not limited to fuel economy, emissions and drivability of the vehicle. In an exemplary embodiment, the combustion input parameter having the highest priority can correspond to adjustment of the mass airflow into the diesel engine. The combustion input parameter having the second highest priority can correspond to adjustment of the post injected fuel mass into the diesel engine. The combustion input parameter having the third highest (e.g., lowest priority in the exemplary embodiment) priority can correspond to adjustment of the main injection fuel timing.

Further, respective upper and lower limits may be monitored for each combustion input parameter sufficient for meeting an operator torque request and maintaining engine output power during the SCR warm-up strategy. In other words, the respective upper and lower limits define thresholds where adjustments applied to the respective combustion input parameters that exceed the respective upper limit or succeed the respective lower limit are not desirable. In a non-limiting example, adjustment of the mass airflow into the diesel engine can include respective upper and lower limits defining thresholds where adjustments not exceeding 50 mg of exhaust gas mass flow into the diesel engine will remain within the respective upper and lower limits. In another non-limiting example, adjustment of the of the post injected fuel mass into the diesel engine can include respective upper and lower limits defining thresholds where adjustments not exceeding 5 milliliters of post injected fuel mass will remain within the respective upper and lower limits. In another non-limiting example, adjustment of the of the main injection fuel timing of the diesel engine can include respective upper and lower limits defining thresholds where adjustments of injected fuel mass will remain within the respective upper and lower limits. For instance, the upper and lower limits can may calibrated according to specific bounds that dictate how much of a timing change (e.g., advancing or retarding) to the main injection fuel timing can occur sufficient for meeting an operator torque request and maintaining engine output power during the SCR warm-up strategy.

In an exemplary embodiment, the PI controller that is implemented within the EGTM module 60 is utilized to provide the feedback adjustment term and thereby determine and apply a magnitude of adjustment for the combustion input parameter having the highest priority. The magnitude of adjustment is proportional to the feedback adjustment term. The applied magnitude of adjustment is compared to the respective upper and lower limits of the combustion input parameter having the highest priority. If the comparing determines that applying the magnitude of adjustment to the combustion input parameter having the highest priority will remain within the respective upper and lower limits, the combustion input parameter having the highest priority can be adjusted by the magnitude of adjustment to increase the first temperature to achieve the desired temperature. In an exemplary embodiment, reducing or decreasing the mass airflow into the diesel engine 12 by a magnitude of adjustment proportional to the feedback adjustment term will increase the first temperature (i.e., SCR device temperature) to achieve the desired temperature. Accordingly, the decreased magnitude of adjustment to the mass airflow into the diesel engine can be achieved by increasing a magnitude of exhaust gas mass flow into the diesel engine to reduce the mass airflow into the diesel engine, wherein the increased magnitude of exhaust gas mass flow is proportional to the decreased magnitude of mass airflow.

However, if applying the magnitude of adjustment to the combustion input parameter having the highest priority will not remain within the respective upper and lower limits, at least two of the combustion input parameters can be coupled. A respective coupling magnitude of adjustment can be determined and applied to respective ones of the coupled combustion input parameters. The coupled combustion input parameters can be adjusted by the respective ones of the coupling magnitudes to increase the first temperature (i.e., SCR device temperature) to achieve the desired temperature. Each of the coupling magnitudes of adjustment are constrained within the respective upper and lower limits when applied to the respective combustion input parameter. Further, a sum of each of the determined coupling magnitudes must be proportional to the feedback adjustment term.

In one embodiment, only the combustion input parameters having the highest and the second highest priorities are adjusted by respective ones of the coupling magnitudes of adjustment to increase the first temperature (i.e., SCR device temperature) to achieve the desired temperature. In another embodiment, the combustion input parameters having the highest, the second highest and the third highest priorities are adjusted by respective ones of the coupling magnitudes of adjustment to increase the first temperature to achieve the desired temperature. It will be appreciated that any combination of at least two combustion input parameters can be adjusted by respective ones of the coupling magnitudes of adjustment so long as the sum of the coupling magnitudes of adjustment is proportional to the feedback adjustment term and each of the coupling magnitudes of adjustment are constrained within the respective upper and lower limits when applied to the respective combustion input parameter.

As aforementioned, the adjustment range includes a range greater than the threshold temperature and less than the desired temperature. In a non-limiting example, the light-off temperature (i.e., threshold temperature) of the DOC 28 is about 225° C. and the light-off temperature (i.e., desired temperature) of the SCR device (i.e., catalyst 30) is about 250° C. Due to the narrowed range of temperatures included within the adjustment range, initiating the adjusted SCR warm-up strategy based on the feedback adjustment term to converge the SCR device temperature toward the desired temperature will only occur over a short time period, and therefore, result in minimal smoke increase in the emissions and minimal losses to fuel economy because the adjusted SCR warm-up strategy is terminated immediately upon reaching the desired temperature. Further, the adjustment range excludes lower temperatures (i.e., first stage of the EGTM) as the engine is still warming up and is close to misfire. Similarly, providing a feedback adjustment term during SCR temperature maintenance (i.e. third stage of the EGTM), would result in increased losses to fuel economy.

The disclosure has described certain preferred embodiments and modifications thereto. Further modifications and alterations may occur to others upon reading and understanding the specification. Therefore, it is intended that the disclosure not be limited to the particular embodiment(s) disclosed as the best mode contemplated for carrying out this disclosure, but that the disclosure will include all embodiments falling within the scope of the appended claims.

The invention claimed is:

1. A method for warming-up a selective catalytic reduction (SCR) device in an exhaust aftertreatment system for a diesel engine, the aftertreatment system including a diesel oxidation catalyst upstream of the SCR device, the method comprising:
    monitoring a plurality of combustion input parameters during an SCR warm-up strategy;
    monitoring a first temperature related to the temperature of the SCR device and a second temperature related to the temperature of the diesel oxidation catalyst within the aftertreatment system;
    providing a feedback adjustment term as a function of a deviation in the first temperature from a desired temperature only when both the monitored first and second temperatures are within a predetermined adjustment range, said predetermined adjustment range comprising a range of temperatures greater than a threshold temperature corresponding to a light-off diesel oxidation catalyst temperature at which the diesel oxidation catalyst operates at maximum efficiency and less than the desired temperature corresponding to a light-off SCR device temperature at which the SCR device operates at maximum efficiency;
    initiating an adjusted SCR warm-up strategy based on the feedback adjustment term to converge the first temperature toward the desired temperature; and
    operating the engine in accordance with the adjusted SCR warm-up strategy.

2. The method of claim 1 further comprising:
    terminating the adjusted SCR warm-up strategy when either of the monitored first and second temperatures is not within the adjustment range.

3. The method of claim 1 further comprising:
    terminating the SCR warm-up strategy when the monitored first temperature achieves the desired temperature.

4. The method of claim 1 wherein the monitored first temperature and the monitored second temperature are measured at different locations within the exhaust aftertreatment system.

5. The method of claim 1 wherein the monitored first temperature and the monitored second temperature are measured at the same location within the exhaust aftertreatment system.

6. The method of claim 1 wherein the combustion input parameters are selected from the group consisting of: a mass airflow into the diesel engine, a post injected fuel mass into the diesel engine and a main injection fuel timing of the diesel engine.

7. The method of claim 1 wherein initiating the adjusted SCR warm-up strategy based on the feedback adjustment term to converge the first temperature toward the desired temperature comprises:
    adjusting at least one of the combustion input parameters based on the feedback adjustment term to increase the first temperature.

8. A method for warming-up a selective catalytic reduction (SCR) device in an exhaust aftertreatment system for a diesel engine, the aftertreatment system including a diesel oxidation catalyst upstream of the SCR device, the method comprising:
    monitoring a plurality of combustion input parameters during an SCR warm-up strategy;
    monitoring a first temperature and a second temperature within the aftertreatment;
    providing a feedback adjustment term as a function of a deviation in the first temperature from a desired temperature only when the monitored first and second temperatures are within a predetermined adjustment range; and
    operating the engine in accordance with an adjusted SCR warm-up strategy comprising adjusting at least one of the combustion input parameters based on the feedback adjustment term to increase the first temperature to converge toward the desired temperature, comprising:
    prioritizing each of the combustion input parameters from a highest priority to a lowest priority for adjustment,
    monitoring respective upper and lower limits for each combustion input parameter sufficient for meeting an operator torque request and maintaining engine output power during the SCR warm-up strategy, applying an adjustment to the combustion input parameter having the highest priority that is proportional to the feedback adjustment term, and if the adjusted combustion input parameter is within the respective upper and lower limits, adjusting the combustion input parameter having the highest priority by the adjustment to increase the first temperature.

9. The method of claim 8 further comprising:
    if the adjusted combustion input parameter is not within the respective upper and lower limits;
        coupling at least two of the combustion input parameters,
        determining respective coupling adjustments applied to respective ones of the coupled at least two combustion input parameters, wherein each of the adjusted coupled at least two combustion input parameters are constrained within the respective upper and lower limits and the sum of the respective coupling adjustments is proportional to the feedback adjustment term, and
        adjusting the coupled at least two combustion input parameters by the respective coupling adjustment to increase the first temperature.

10. The method of claim 9 wherein the coupled at least two combustion input parameters consist of the two highest priority combustion input parameters.

11. The method of claim 9 wherein the coupled at least two combustion input parameters consist of the three highest priority combustion input parameters.

12. The method of claim 8 wherein:
    the combustion input parameter having the highest priority corresponds to a mass airflow into the diesel engine;
    the combustion input parameter having the second highest priority corresponds to a post injection fuel mass into the diesel engine; and
    the combustion input parameter having the lowest priority corresponds to a main injection fuel timing.

13. A method for warming-up a selective catalytic reduction (SCR) device in an exhaust aftertreatment system for a diesel engine, the aftertreatment system including a diesel oxidation catalyst (DOC) upstream of the SCR device, the method comprising:
    monitoring a plurality of combustion input parameters during an SCR warm-up strategy;
    monitoring an SCR device temperature and a DOC temperature; providing a feedback adjustment term as a function of a deviation in the SCR device temperature from a desired SCR device temperature only when both the monitored SCR device temperature is less than the desired SCR device temperature corresponding to a light-off SCR device temperature at which the SCR devices operates at maximum efficiency and the DOC temperature is at least a predetermined threshold DOC temperature corresponding to a light-off DOC temperature at which the DOC operates at maximum efficiency;

adjusting at least one of the combustion input parameters based on the feedback adjustment term; and operating the engine in accordance with said adjusted one of the combustion input parameters to increase the SCR device temperature toward the desired SCR device temperature.

14. The method of claim 13 wherein the adjusting the at least one of the combustion input parameters based on the feedback adjustment term comprises decreasing a mass airflow into the diesel engine proportionally to the feedback adjustment term.

15. The method of claim 14 wherein the decreasing the mass airflow into the diesel engine comprises increasing an exhaust gas mass flow into the diesel engine.

16. The method of claim 13 wherein adjusting the at least one of the combustion input parameters based on the feedback adjustment term comprises:

increasing an injected fuel mass into the diesel engine proportionally to the feedback adjustment term.

17. The method of claim 13 wherein adjusting the at least one of the combustion input parameters based on the feedback adjustment term comprises:

retarding a main injection fuel timing proportionally to the feedback adjustment term.

18. An apparatus comprising a diesel engine and an exhaust aftertreatment system, comprising:

an exhaust gas recirculation system for directing portions of an exhaust gas feedstream back into the diesel engine for combination with fresh air in subsequent combustion cycles;

a diesel oxidation catalyst;

a selective catalytic reduction (SCR) device disposed downstream of the diesel oxidation catalyst;

at least one temperature sensor disposed between the diesel oxidation catalyst and the SCR device; and a central processing unit configured to execute the following steps, comprising, monitoring a plurality of combustion input parameters during an SCR warm-up strategy, monitoring a first temperature related to the temperature of the SCR device and a second temperature related to the temperature of the diesel oxidation catalyst within the exhaust aftertreatment system, providing a feedback adjustment term as a function of a deviation in the first temperature from a desired temperature only when both the monitored first and second temperatures are within a predetermined adjustment range, said predetermined adjustment range comprising a range of temperatures greater than a threshold temperature corresponding to a light-off diesel oxidation catalyst temperature at which the diesel oxidation catalyst operates at maximum efficiency and less than the desired temperature corresponding to a light-off SCR device temperature at which the SCR device operates at maximum efficiency, and initiating an adjusted SCR warm-up strategy based on the feedback adjustment term to converge the first temperature toward the desired temperature.

* * * * *